(12) United States Patent
Fujita et al.

(10) Patent No.: US 8,048,400 B2
(45) Date of Patent: Nov. 1, 2011

(54) PROCESS FOR PREPARATION OF ALUMINA POWDER AND PRECURSOR THEREOF

(75) Inventors: Noriaki Fujita, Ehime (JP); Shinji Fujiwara, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/547,159

(22) Filed: Aug. 25, 2009

(65) Prior Publication Data

US 2010/0047157 A1 Feb. 25, 2010

(30) Foreign Application Priority Data

Aug. 25, 2008 (JP) .............................. P2008-215055

(51) Int. Cl.
*C01F 7/02* (2006.01)
(52) U.S. Cl. ........................................ 423/629; 423/625
(58) Field of Classification Search ........... 423/625–630
See application file for complete search history.

(56) References Cited

U.S. PATENT DOCUMENTS

| 6,403,007 | B1 * | 6/2002 | Kido et al. | ..................... 264/234 |
| 2008/0015299 | A1 * | 1/2008 | Takemura et al. | ............. 524/437 |

FOREIGN PATENT DOCUMENTS

| JP | 56009427 A | 1/1981 |
| JP | 59059223 A | 4/1984 |
| JP | 08-301616 A | 11/1996 |

OTHER PUBLICATIONS

"Technical Problems and Countermeasures therefor of Sol-Gel Process"; pp. 76-80 (1990) with its English Translation.
T. Kawaguchi; "Shrinkage Behavior of Silica Gels During Drying"; Journal of Non-Crystalline Solids 100; pp. 220-225; (1988).
Search Report and Written Opinion issued May 27, 2011 from the French Patent Office in French Patent Application No. 0955769 (with English translation of Written Opinion).

* cited by examiner

*Primary Examiner* — Edward Johnson
(74) *Attorney, Agent, or Firm* — Panitch Schwarze Belisario & Nadel LLP

(57) ABSTRACT

There is provided a process for the preparation of a alumina precursor powder from aluminum hydroxide powder obtained by hydrolysis of aluminum alkoxide which precursor enables to provide alumina powder with a high volumetric efficiency.

Such process comprises mixing aluminum hydroxide powder obtained by hydrolysis of an aluminum alkoxide with the following aqueous medium so as to obtain an aluminum hydroxide mixed slurry and then drying the aluminum hydroxide mixed slurry:

aqueous medium: water or a medium mixture of water and a water-soluble alcohol wherein a water content in said medium mixture is not less than 15 parts by weight to 100 parts by weight of the medium mixture.

10 Claims, No Drawings

PROCESS FOR PREPARATION OF ALUMINA POWDER AND PRECURSOR THEREOF

FIELD OF THE INVENTION

The present invention relates to a process for preparation of alumina precursor powder and a process for preparation of alumina powder.

CROSS REFERENCE TO RELATED APPLICATION

The present application claims the priority under the Paris Convention based on Japanese Patent Application No. 2008-215055, which is incorporated herein by reference in their entirety.

BACKGROUND OF THE INVENTION

Alumina powder has been used widely in industries as row materials for ceramic materials and the like, an abrasive compounds and fillers. As a process for the preparation of such alumina powder, a process of calcining an alumina precursor powder is known. As the alumina precursor powder, aluminum hydroxide powder obtained by hydrolysis of an aluminum alkoxide is used. A process of calcining the aluminum hydroxide powder is known wherein the powder which is charged in a calcination vessel such as a sagger case is calcined so as to prevent flying apart of the alumina precursor powder (see, for example, Reference 1 which is referred to below).

However, the aluminum hydroxide powder which is obtained by the hydrolysis of the aluminum alkoxide has a lower bulk density. Thus, the conventional process for the preparation of alumina powder wherein such aluminum hydroxide powder as a precursor is heated is not always an industrially advantageous process because of a low volumetric efficiency.

Patent Reference 1
JP H08-301616 A (paragraphs [0002] and [0003])

SUMMARY OF THE INVENTION

Therefore, it is an object of the present invention is to provide a process for the preparation of alumina precursor powder from the aluminum hydroxide powder obtained by the hydrolysis of the aluminum alkoxide, which precursor can be used to produce alumina powder at a higher volumetric efficiency.

The inventers made intensive studies so as to achieve the above-mentioned object, and have found, as a result, a new fact that an alumina precursor powder having a higher bulk density can be obtained when the aluminum hydroxide powder obtained by the hydrolysis of the aluminum alkoxide is mixed with a specific aqueous medium followed by drying, so that they have finally completed the present invention.

That is, the process for the preparation of the alumina precursor powder according to the invention is characterized in that the aluminum hydroxide powder obtained by the hydrolysis of the aluminum alkoxide is mixed with the following aqueous medium so as to obtain an aluminum hydroxide mixed slurry followed by the drying said slurry:

aqueous medium: water or a medium mixture of water and at least one water-soluble alcohol wherein a water content in said medium mixture is not less than 15 parts by weight based on 100 parts by weight of the medium mixture.

The process for the preparation of the alumina powder according to the invention is characterized by calcining the alumina precursor powder obtained by the above-mentioned preparation process. Particularly, when the alumina precursor powder is charged in a calcination vessel, such powder can be filled in the vessel at a higher density.

The preparation process according to the invention produces the alumina precursor powder having a higher bulk density from the aluminum hydroxide powder obtained by the hydrolysis of the aluminum alkoxide. Therefore, said alumina precursor powder can be calcined while being charged in a calcination vessel at a higher density, which leads to the preparation of the alumina powder at a higher volumetric efficiency.

DETAILED DESCRIPTION OF THE INVENTION

Alumina Precursor Powder

The alumina precursor powder used in the process according to the invention is obtained by mixing aluminum hydroxide powder obtained by the hydrolysis of an aluminum alkoxide with the above-mentioned aqueous medium followed by drying.

The aluminum alkoxide is represented by a general formula of $Al(OR)_3$ wherein R represents an alkyl group, which preferably has about 1 to 4 carbon atoms. Examples of such an alkyl group include a methyl, an ethyl, a n-propyl, an isopropyl, a n-butyl, an isobutyl, a sec-butyl and a tert-butyl group. The specific examples of the aluminum alkoxide are for example aluminum isopropoxide, aluminum ethoxide, aluminum sec-butoxide and aluminum tert-butoxide.

The aluminum hydroxide powder which is preferably used in the preparation process of the alumina precursor powder according to the present invention is fine powder particles which have a mean primary particle diameter of not more than 1 μm, and generally in the range between about 0.02 μm and about 0.05 μm and a low bulk density in the range between about 0.1 and −0.2 $g/cm^3$. In addition, it is preferable that a BET specific surface area of said aluminum hydroxide powder is in general about 300 $m^2/g$, and its mean particle diameter is about 10 μm. In the process for the preparation of the alumina precursor powder according to the present invention, aluminum hydoxide powder other than that prepared by the hydrolysis may be used as far as it has a particle diameter as well as a bulk density as described above. However, it is preferable to use the aluminum hydroxide powder obtained by the hydrolysis.

Said mean primary particle diameter is calculated as an arithmetic average of measured particle diameters of about twenty particles in a photo image of the particles obtained by, for example, a transmission electron microscope (TEM). It is noted that the particle diameter means a Krumbein diameter or a maximum diameter along a fixed direction of the particle. That is, for example when an abscissa axis of the TEM photo image of the particles is defined as an X-axis and the X-axis is assumed to be a fixed direction, the particle diameter is a length of a particle along the X-axis obtained by projecting the particle onto the X-axis.

Said bulk density is the same as an apparent density defined in JIS Z 8901, which means a value of a mass of powder divided by a bulk volume of the powder, and such value is obtained by dividing a mass of the powder fully charged in a vessel having a known volume by said volume of the vessel.

Said BET specific surface area is measured by using, for example as described below, a specific surface area analyzer the principle of which is the nitrogen adsorption technique.

Said mean particle diameter is measured by using, for example as described below, a particle size distribution measurement apparatus the basic principle of which is the laser scattering technique.

The above described aluminum hydroxide powder is mixed with the above-mentioned aqueous medium to obtain an aluminum hydroxide mixed slurry. The aqueous medium is either water or the medium mixture of water and at least one water-soluble alcohol. The water-soluble alcohol, which is not particularly limited, is preferably an alcohol having not more than 3 carbon atoms such as methanol, ethanol, propanol, and isopropanol from a viewpoint of the energy efficiency upon heating the medium.

The water content in the medium mixture is not less than 15 parts by weight, preferably 15-80 parts by weight, and more preferably 18-30 parts by weight based on 100 parts by weight of the medium mixture. When the water content is less than 15 parts by weight, the alumina precursor powder with a higher bulk density can not be obtained. On the other hand, the water content of not more than 80 parts by weight is preferable with respect to the energy consumption required for the drying.

An aluminum hydroxide mixed slurry is obtained by mixing the aluminum hydroxide powder with such aqueous medium. As a method for such mixing, which is not particularly limited, for example, a method of stirring the aluminum hydroxide powder and the aqueous medium which are charged in a reaction vessel, or a method of radiating ultrasonic wave to the aluminum hydroxide and the aqueous medium to disperse the aluminum hydroxide powder can be employed.

In a manner wherein the aluminum hydroxide and the aqueous medium are charged and stirred, for example, a concentration of the aluminum hydroxide powder in the slurry is generally 10-25 wt %, and preferably 10-20 wt %. The concentration of the aluminum hydroxide powder of not less than 10 wt % is preferable in terms of the processing efficiency. In addition, the concentration of not more than 25 wt % is preferable because the homogeneously dispersed slurry is easily formed.

The slurry is dried to obtain alumina precursor powder. The method for drying is not particularly limited, and it is preferable as the drying method to evaporate the aqueous medium in the slurry by heating the slurry. It enables recovery of the aqueous medium by cooling the evaporated aqueous medium in a condenser, and thus recovered medium can be re-used as the aqueous medium for dispersing the aluminum hydroxide powder. The temperature at which the slurry is heated (i.e. a maximum temperature of heating) is not particularly limited, but it is preferably not lower than the boiling point of the aqueous medium used. When the aqueous medium is a mixture of water and the water-soluble alcohol(s), such temperature is preferably not lower than the lowest boiling point of the boiling points of water and the water-soluble alcohol(s). The more preferable temperature at which the slurry is heated is not lower than the highest boiling point of the boiling points of water and the water-soluble alcohol(s).

The alumina precursor powder obtained in the above mentioned manner usually has a higher bulk density of 0.3-0.8 g/cm$^3$. Therefore, the alumina precursor powder can be calcined while it is charged at a higher density in a calcination vessel mentioned below, which enables to prepare the alumina powder at a higher volumetric efficiency. The BET specific surface area of the alumina precursor powder is usually about 130-300 m$^2$/g, and its average particle diameter is about 5-500 μm.

Alumina Powder

Alumina powder can be obtained by calcining the alumina precursor powder. The calcination is preferably performed by charging the alumina precursor powder in a calcination vessel. Examples of the calcination vessel include a sagger case. The material for the calcination vessel is not particularly limited, but an alumina based material is preferably exemplified as such material in terms of the avoidance of contamination of the alumina powder. The "alumina based material" is a mixture essentially consisting of alumina and other component(s), and contains alumina as its main component. A content of the alumina in the alumina based material is preferably not less than 90% by weight, more preferably not less than 95% by weight, and further preferably not less than 99% by weight. As said other component(s), silica may be exemplified.

Examples of a furnace which is used for the calcination include a static calcination furnace such as a tunnel kiln, a box-type hatch furnace with gas flow, a parallel-flow box-type batch furnace and the like; and a calcination furnace such as a rotary kiln.

The temperature in the calcination and the time for the calcination can be selected depending on the intended properties of the alumina powder. As specific examples thereof for the preparation of α-alumina powder, a temperature increase rate up to the calcination temperature is for example 30-500° C./hr, and the calcination temperature is for example 1100-1450° C., and preferably 1200-1350° C., and the time to keep such calcination temperature is for example between 30 minutes and 24 hours, and preferably between 1 hour and 10 hours.

With respect to the atmosphere for the calcination, the calcination may be performed, for example in an inert gas such as nitrogen gas, argon gas as well as in air. The calcination may be also performed in an atmosphere that has a higher partial pressure of steam as in a gas furnace in which the calcination is carried out with the combustion of, for example, propane gas.

The properties of the alumina powder obtained through the above-described calcination, α-alumina powder, for example, usually has a BET specific surface area of 2-20 m$^2$/g, and a mean particle diameter of for example 10-500 μm. In addition, when the alumina powder is in the form of aggregated particles, grinding may be performed depending on the intended application.

As to the manner of grinding the alumina powder is not particularly limited, and any known manner can be used such as a vibration mill, a ball mill, a jet mill, and either dry condition or wet condition can be used.

The BET specific surface area of the α-alumina powder obtained by the above described grinding is usually 2-20 m$^2$/g, and its mean particle diameter is less than 1.0 μm. In such a way, α-alumina powder with a reduced amount of the aggregated particles can be obtained by grinding.

The obtained α-alumina powder is used as, for example, an additive for cosmetics, an additive for brake lining, or a catalyst support, and also it is used as a material for thermally-conductive sintered article. In addition, the α-alumina powder is useful as a raw material of an inorganic porous film which is adhered to an electrode surface for preventing the formation of an internal short circuit in a lithium battery so as to enhance the safety of the battery. Further, fluorescence powder substance can be prepared by using the α-alumina as a raw material.

In addition, the resulted α-alumina powder is useful as, for example, a raw material for the preparation of an α-alumina sintered article. The α-alumina sintered article is preferred for an application which requires a higher strength such as cutting tools, bioceramics and bulletproof plates. The other applications of the α-alumina sintered article include, for example, parts for semiconductor fabrication apparatus such as a wafer handler; electronic parts such as thermally-conductive filler and an oxygen sensor; translucent tubes such as a sodium lamp and a metal halide lamp; and ceramics filters used for the removal of solid components contained in a gas such as an exhaust gas, the filtration of an aluminum melt and the filtration of foods such as beer. The ceramics filters include a selective permeation filer, for example, to make hydrogen selectively permeate in a fuel cell, or gas components (such as carbon monoxide, carbon dioxide, nitrogen, oxygen) selectively permeate which are formed upon purification of oil. Also, the ceramics filters can be used as catalytic support for supporting a catalytic component on a surface of the selective permeation filter.

The alumina powder according to the invention is not limited to α-alumina, and it may have the other crystal structure. For example, the alumina powder may be γ-, δ-, η-, θ-, κ-, ρ-, or x-alumina.

The present application will be explained in detail below with reference to examples, but the present invention is not limited to such example. It is noted that each of the properties is measured as follows:

Bulk Density

The bulk density was measured according to JIS Z 8901.

BET Specific Surface Area

The BET specific surface area was measured with a specific surface area measurement apparatus (FlowSorb II 2300 commercially available from Shimadzu Corporation), measurement principle of which is the nitrogen adsorption method.

Mean Particle Diameter

The mean particle diameter was measured with a particle size distribution measurement apparatus (Microtrac HRA X-100 commercially available from Honeywell), the basic principle of which is a laser scattering method. Upon the measurement, the aluminum hydroxide power, the alumina precursor powder or the alumina powder was dispersed with ultrasonic wave in 0.2 wt % sodium hexametaphosphate aqueous solution.

EXAMPLES

Example 1

Firstly, aluminum alkoxide (aluminum isopropoxide) was hydrolyzed with water so as to obtain aluminum hydroxide powder. The aluminum hydroxide powder had a bulk density of 0.12 g/cm$^3$, a BET specific surface area of 294 m$^2$/g and a mean particle diameter of 11.0 μm.

Then, 12 parts by weight of the aluminum hydroxide powder was mixed with 100 parts by weight of an aqueous medium to obtain an aluminum hydroxide slurry. As said aqueous medium, a mixture medium was used which was obtained by mixing 19 parts by weight of water with 81 parts by weight of isopropanol. The concentration of the aluminum hydroxide in the slurry is 11 wt %.

The slurry was charged in a multitank having a capacity of 13 liters, and aluminum hydroxide was dispersed by mixing with a stirring blade at a rotation number of 150 rpm to obtain a mixed slurry of aluminum hydroxide, water and isopropanol. The mixed slurry was heated in a following way:

That is, the mixed slurry was heated to a temperature of 80° C., kept at a temperature of 80° C. for one hour, and then heated to a temperature of 130° C. for drying the aqueous medium was evaporated and alumina precursor powder was obtained. Resulted alumina precursor powder had a bulk density of 0.39 g/cm$^3$, a BET specific surface area of 180 m$^2$/g and a mean particle diameter of 15.9 μm.

The alumina precursor powder was heated at a temperature increase rate of 300° C./hr, and calcined at a temperature of 1300° C. for 3 hours so as to obtain α-alumina powder. It is noted that a sagger case made of alumina was used for the calcination.

The resulted α-alumina powder had a BET surface area of 4.8 m$^2$/g and a mean particle diameter of 8.5 μm. The α-alumina powder formed aggregated particles. Therefore, the α-alumina powder was ground with a jet mill.

Specifically, the α-alumina powder was ground with a grinding pressure of 4.5 MPa while feeding the α-alumina powder at 8 kg/hr into a jet mill (PJM-280SP commercially available from Nippon Pneumatic MFG. Co., LTD.). As a result, the α-alumina powder was obtained which had a BET specific surface area of 4.2 m$^2$/g and a mean particle diameter of 0.56 μm.

Comparative Example 1

Firstly, an aluminum alkoxide which was the same as in Example 1 was hydrolyzed with water so as to obtain aluminum hydroxide powder which had the same properties as those of aluminum hydroxide powder of Example 1. Then, 12 parts by weight of the aluminum hydroxide powder was mixed with 100 parts by weight of isopropanol to obtain an aluminum hydroxide slurry. The concentration of the aluminum hydroxide in this slurry is 11 wt %.

The slurry was charged in a glass flask having a capacity of 2 liters, and aluminum hydroxide was dispersed by mixing with a stirring blade at a rotation number of 150 rpm so as to obtain a mixed slurry of aluminum hydroxide and isopropanol. The mixed slurry was heated in a following way:

That is, the mixed slurry was heated to a temperature of 80° C., kept at a temperature of 80° C. for one hour, and then heated to a temperature of 150° C. for drying isopropanol was evaporated and alumina precursor powder was obtained. Resulted alumina precursor powder had a bulk density of 0.17 g/cm$^3$, a BET specific surface area of 294 m$^2$/g and a mean particle diameter of 10.8 μm.

The above results indicates that the alumina precursor powder of Comparative Example 1 which was obtained by mixing the aluminum hydroxide powder with isopropanol and drying the mixture has a lower bulk density than that of the alumina precursor powder of Example 1, which makes a volumetric efficiency of the calcination reduced.

Comparative Example 2

Firstly, an aluminum alkoxide which was the same as in Example 1 was hydrolyzed with water so as to obtain aluminum hydroxide powder which had the same properties as those of aluminum hydroxide powder of Example 1. Then, 12 parts by weight of the aluminum hydroxide powder was mixed with 100 parts by weight of an aqueous medium to obtain an aluminum hydroxide slurry. As the aqueous medium, a medium mixture was used which was obtained by mixing 10 parts by weight of water and 90 parts by weight of isopropanol. The concentration of the aluminum hydroxide in this slurry is 11 wt %.

The slurry was charged in a glass flask having a capacity of 2 liters, and aluminum hydroxide was dispersed by mixing with a stirring blade at a rotation number of 150 rpm to obtain a mixed slurry of aluminum hydroxide, water and isopropanol. The mixed slurry was heated in a following way:

That is, the slurry was kept at a temperature of 80° C. at the beginning of the heating, and finally heated to a temperature of 130° C. so that the aqueous medium was evaporated and alumina precursor powder was obtained. Resulted alumina precursor powder had a bulk density of 0.18 g/cm$^3$, a BET specific surface area of 250 m$^2$/g and a mean particle diameter of 10.7 μm.

The above results indicates that the alumina precursor powder of Comparative Example 2 which was obtained by mixing the aluminum hydroxide powder with the aqueous medium containing water of less than 15 parts by weight based on 100 parts by weight of the medium mixture has a lower bulk density than that of the alumina precursor powder of Example 1, which makes a volumetric efficiency of the calcination reduced.

What is claimed is:

1. A process for preparation of an alumina precursor powder comprising:
    mixing an aluminum hydroxide powder obtained by hydrolysis of an aluminum alkoxide with an aqueous medium to obtain an aluminum hydroxide mixed slurry; and
    then drying the aluminum hydroxide mixed slurry,
        wherein the aqueous medium comprises one of water and a mixture of water and at least one water-soluble alcohol,
        wherein the water content in the mixture is not less than 15 parts by weight based on 100 parts by weight of the mixture.

2. A process for preparation of alumina powder comprising calcining the alumina precursor powder obtained by the process according to claim 1.

3. The process according to claim 2, wherein the alumina precursor powder is calcined while it is charged in a calcination vessel.

4. The process according to claim 1, wherein the aluminum hydroxide mixed slurry is dried at a temperature of 130° C. or less.

5. The process according to claim 4 further comprising heating the aluminum hydroxide mixed slurry to a temperature lower than the temperature at which the slurry is dried and maintaining the aluminum hydroxide mixed slurry at the lower temperature for a predetermined duration prior to drying of the aluminum hydroxide mixed slurry.

6. The process according to claim 5 wherein the aluminum hydroxide mixed slurry is maintained at the temperature lower than the temperature at which the slurry is dried for one hour.

7. A process for preparation of an alumina precursor powder comprising:
    hydrolyzing an aluminum alkoxide to obtain an aluminum hydroxide powder;
    mixing the aluminum hydroxide powder with an aqueous medium to obtain an aluminum hydroxide mixed slurry; and
    drying the aluminum hydroxide mixed slurry,
        wherein the aqueous medium comprises one of water and a mixture of water and at least one water-soluble alcohol,
        wherein the water content in the mixture is not less than 15 parts by weight based on 100 parts by weight of the mixture.

8. The process according to claim 7, wherein the aluminum hydroxide mixed slurry is dried at a temperature of 130° C. or less.

9. The process according to claim 8 further comprising heating the aluminum hydroxide mixed slurry to a temperature lower than the temperature at which the slurry is dried and maintaining the aluminum hydroxide mixed slurry at the lower temperature for approximately one hour prior to drying of the aluminum hydroxide mixed slurry.

10. The process according to claim 9 wherein the aluminum hydroxide mixed slurry is maintained at the temperature lower than the temperature at which the slurry is dried for one hour.

* * * * *